(12) United States Patent
Hanawa et al.

(10) Patent No.: US 11,043,680 B2
(45) Date of Patent: Jun. 22, 2021

(54) ELECTRODE MATERIAL INCLUDING SMALL DIAMETER, CARBON NANOTUBES BRIDGING LARGE DIAMETER CARBON NANOTUBES, REDOX FLOW BATTERY ELECTRODE, REDOX FLOW BATTERY, AND METHOD FOR PRODUCING ELECTRODE MATERIAL

(71) Applicant: SHOWA DENKO K.K., Tokyo (JP)

(72) Inventors: Kenzo Hanawa, Ichihara (JP); Ryuji Monden, Yachiyo (JP); Takenori Nishikata, Chiba (JP)

(73) Assignee: SHOWA DENKO K.K., Tokyo (JP)

( * ) Notice: Subject to any disclaimer, the term of this patent is extended or adjusted under 35 U.S.C. 154(b) by 375 days.

(21) Appl. No.: 15/034,372

(22) PCT Filed: Nov. 11, 2014

(86) PCT No.: PCT/JP2014/079842
§ 371 (c)(1),
(2) Date: May 4, 2016

(87) PCT Pub. No.: WO2015/072452
PCT Pub. Date: May 21, 2015

(65) Prior Publication Data
US 2016/0293970 A1    Oct. 6, 2016

(30) Foreign Application Priority Data

Nov. 13, 2013    (JP) .............................. JP2013-234636

(51) Int. Cl.
*H01M 4/96*        (2006.01)
*H01M 8/18*        (2006.01)
(Continued)

(52) U.S. Cl.
CPC ............. *H01M 4/96* (2013.01); *C01B 32/158* (2017.08); *H01M 4/8652* (2013.01);
(Continued)

(58) Field of Classification Search
CPC .......................... H01M 4/96; H01M 8/18–188
See application file for complete search history.

(56) References Cited

U.S. PATENT DOCUMENTS 8,333,948 B2    12/2012 Pak et al.
2002/0177032 A1    11/2002 Suenaga et al.
(Continued)

FOREIGN PATENT DOCUMENTS

CA    2754372 A1 *    4/2013    .......... H01M 4/0402
CA    2776205 A1 *    11/2013    ............ H01M 4/366
(Continued)

OTHER PUBLICATIONS

Machine Translation of JP 2009/224181 published to Hama on Oct. 2009.*
Communication dated May 15, 2017 from the European Patent Office in counterpart application No. 14861783.0.
(Continued)

*Primary Examiner* — Sean P Cullen
(74) *Attorney, Agent, or Firm* — Sughrue Mion, PLLC

(57) ABSTRACT

A redox flow battery includes: first carbon nanotubes having an average diameter of 100 nm or r core, and second carbon nanotubes having an average diameter of 30 nm or less, in which the second carbon nanotubes are adhered to surfaces of the first carbon nanotubes such that the second carbon nanotubes bridge between the plural first carbon nanotubes. Since the redox flow battery includes an electrode material and an electrode including the electrode material, the electromotive force and the charging capacity are high.

14 Claims, 2 Drawing Sheets

(51) Int. Cl.
  *H01M 4/86* (2006.01)
  *C01B 32/158* (2017.01)
  *B82Y 30/00* (2011.01)
  *B82Y 40/00* (2011.01)

(52) U.S. Cl.
  CPC ............ *H01M 8/188* (2013.01); *B82Y 30/00* (2013.01); *B82Y 40/00* (2013.01); *C01B 2202/36* (2013.01); *Y02E 60/50* (2013.01); *Y10S 977/742* (2013.01); *Y10S 977/783* (2013.01); *Y10S 977/842* (2013.01); *Y10S 977/90* (2013.01); *Y10S 977/948* (2013.01)

(56) References Cited

U.S. PATENT DOCUMENTS

| | | | |
|---|---|---|---|
| 2009/0075157 A1* | 3/2009 | Pak | B82Y 30/00 429/530 |
| 2012/0301767 A1 | 11/2012 | Kim | |
| 2013/0004657 A1* | 1/2013 | Xu | H01B 1/24 427/122 |
| 2013/0248772 A1* | 9/2013 | Jo | B82Y 30/00 252/503 |
| 2014/0308592 A1 | 10/2014 | Maki et al. | |

FOREIGN PATENT DOCUMENTS

| | | |
|---|---|---|
| CN | 101651201 A | 2/2010 |
| JP | 2002-102694 A | 4/2002 |
| JP | 2003-200052 A | 7/2003 |
| JP | 2006-156029 A | 6/2006 |
| JP | 2009-224181 A | 10/2009 |
| WO | 2013/035741 A1 | 3/2013 |

OTHER PUBLICATIONS

Communication dated Jun. 16, 2017, from the State Intellectual Property Office of People's Republic of China in counterpart Application No. 201480061048.1.

International Search Report of PCT/JP2014/079842, dated Feb. 17, 2015. [PCT/ISA/210].

* cited by examiner

ELECTRODE MATERIAL INCLUDING SMALL DIAMETER, CARBON NANOTUBES BRIDGING LARGE DIAMETER CARBON NANOTUBES, REDOX FLOW BATTERY ELECTRODE, REDOX FLOW BATTERY, AND METHOD FOR PRODUCING ELECTRODE MATERIAL

TECHNICAL FIELD

The present invention relates to an electrode material, a redox flow battery electrode, a redox flow battery, and a method for producing an electrode material.

This application is a National Stage of International Application No. PCT/JP2014/079842 filed Nov. 11, 2014, claiming priority based on Japanese Patent Application No. 2013-234636, filed Nov. 13, 2013, the contents of all of which are incorporated herein by reference in their entirety.

BACKGROUND ART

PTL 1 (Japanese Unexamined Patent Application, First Publication No. 2006-156029) discloses a configuration in which vapor-grown carbon fibers are used as a redox flow battery electrode material. PTL 1 also discloses a configuration in which surfaces of the vapor-grown carbon fibers are treated with nitric acid to be hydrophilic.

CITATION LIST

Patent Literature

[PTL 1] Japanese Unexamined Patent Application, First Publication No. 2006-156029

SUMMARY OF INVENTION

Technical Problem

An object of the present invention is to provide a redox flow battery having high electromotive force and high charging capacity, an electrode with which the redox flow battery can be obtained, and an electrode material with which the electrode can be obtained.

Solution to Problem

That is, the present invention includes the following configurations.

(1) An electrode material including:
first carbon nanotubes having an average diameter of 100 nm or more; and
second carbon nanotubes having an average diameter of 30 nm or less,
in which the second carbon nanotubes are adhered to surfaces of the first carbon nanotubes such that the second carbon nanotubes bridge between the plural first carbon nanotubes.

(2) The electrode material according to (1),
in which the second carbon nanotubes are entangled with the first carbon nanotubes.

(3) The electrode material according to (1) or (2),
in which the average diameter of the first carbon nanotubes is 100 nm to 1000 nm.

(4) The electrode material according to any one of (1) to (3),
in which the average diameter of the second carbon nanotubes is 1 nm to 30 nm.

(5) The electrode material according to any one of (1) to (4),
in which an amount of the second carbon nanotubes added with respect to 100 parts by mass of the first carbon nanotubes is 1 part by mass to 20 parts by mass.

(6) The electrode material according to any one of (1) to (5), further including
a water-soluble conductive polymer.

(7) A redox flow battery electrode including
the electrode material according to any one of (1) to (6).

(8) A redox flow battery including
the electrode according to (7).

(9) A method for producing the electrode material being the electrode material according to any one of (1) to (6),
the method including
a step of mixing first carbon nanotubes having an average diameter of 100 nm or more and second carbon nanotubes having an average diameter of 30 nm or less with each other in a conductive polymer aqueous solution using a wet jet mill.

(10) The method for producing an electrode material according to (9),
in which the mixing using the wet jet mill is performed at a pressure of 150 MPa or higher.

Advantageous Effects of Invention

By using the electrode material and the electrode including the electrode material according to the present invention, a redox flow battery having high electromotive force and high charging capacity can be obtained.

DESCRIPTION OF EMBODIMENTS

Figure 1:
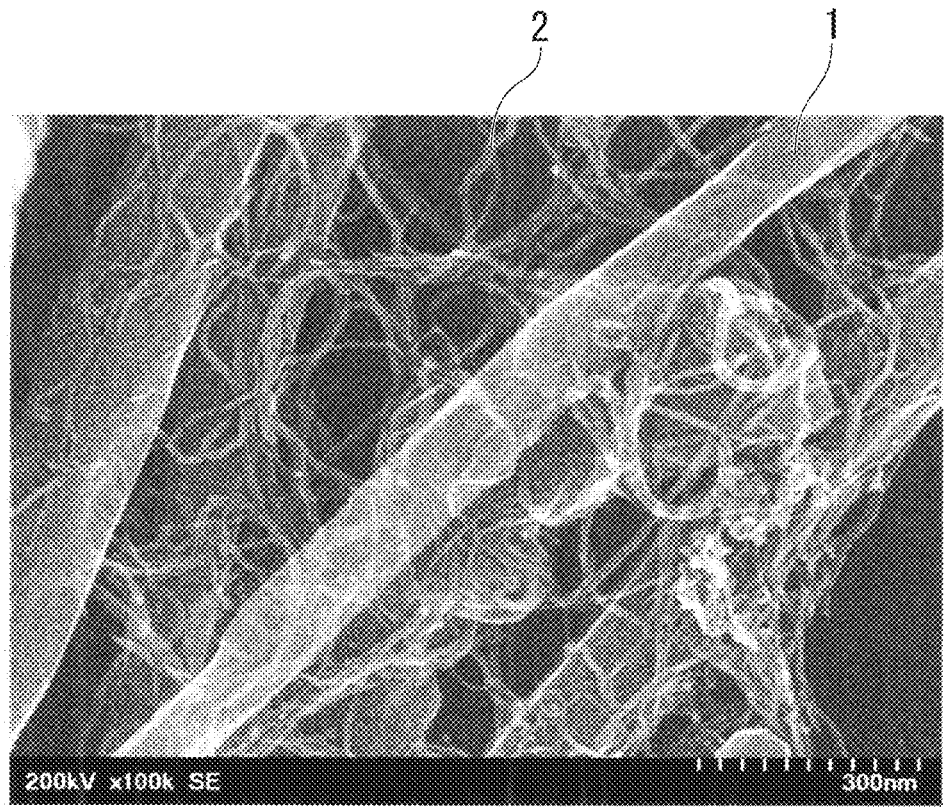
FIG. 1 is a transmission electron microscope image showing an electrode material according to an embodiment of the present invention.

Hereinafter, an electrode material, a redox flow battery electrode, and a redox flow battery according to the present invention will be described in detail appropriately with reference to the drawings.

In the drawings used in the following description, for the sake of convenience, some characteristic portions are shown in an enlarged manner in order to make the characteristics of the present invention easily understood, and dimensional proportions and the like of the respective components are different from the actual ones. Materials, dimensions, and the like in the following description are merely exemplary examples, but the present invention is not limited thereto. Within a range not departing from the scope of the present invention, various modifications can be made.

FIG. 1 is a transmission electron microscope image showing an electrode material according to an embodiment of the present invention. The electrode material according to the present invention includes: first carbon nanotubes 1 having an average diameter of 100 nm or more; and second carbon nanotubes 2 having an average diameter of 30 nm or less, in which the second carbon nanotubes 2 are adhered to surfaces of the first carbon nanotubes 1 such that the second carbon nanotubes 2 bridge between the plural first carbon nanotubes 1. Further, it is preferable that the second carbon nanotubes 2 are entangled with the first carbon nanotubes 1. By adopting the structure in which the second carbon nanotubes 2 bridge between the plural first carbon nanotubes 1, the form of the electrode material can be maintained without being scattered during the formation thereof. In addition, since the second carbon nanotubes 2 bridge between the plural first carbon nanotubes 1, gaps between the first carbon nanotubes 1, which are the main reason for conductivity, can be filled with the second carbon nanotubes 2, thereby improving the conductivity of the electrode material. The improvement of the conductivity of the electrode material implies the improvement of charging-discharging performance of a redox flow battery. In addition, since the second carbon nanotubes 2 are entangled with the first carbon nanotubes 1, the form of the electrode material can be easily maintained, and the conductivity of the electrode material can be further improved.

Here, for example, when the electrode material is observed with a transmission electron microscope, "the bridge structure" may be recognized as the second carbon nanotubes which bridge between the first carbon nanotubes. For example, when 100 arbitrary second carbon nanotubes are observed, preferably 10 or more second carbon tubes and more preferably 50 or more second carbon nanotubes may bridge between the plural first carbon nanotubes. In this case, 100 second carbon nanotubes may be observed at plural positions. For example, 10 second carbon nanotubes may be observed at each of 10 positions, that is, 100 second carbon nanotubes in total may be at 10 positions.

The average diameter of the first carbon nanotubes 1 is 100 nm or more and is preferably 100 nm to 1000 nm and is more preferably 100 nm to 300 nm. The average diameter of the second carbon nanotubes 2 is 30 nm or less and is preferably 1 nm to 30 nm and is more preferably 5 nm to 20 nm. It is preferable that all the fiber lengths of the first carbon nanotubes 1 and the second carbon nanotubes 2 are 1 μm to 100 μm.

When the sizes of the first carbon nanotubes 1 and the second carbon nanotubes 2 are in the above-described range, the electrode material can maintain high strength and high conductivity. The reason for this is as follows. The first carbon nanotubes 1 function as trunks such that the second carbon nanotubes 2 bridge between the plural first carbon nanotubes 1 in a branch form. For example, when the average diameter of the first carbon nanotubes 1 is 100 nm or less, the trunks are unstable. Therefore, a problem such as the cracking of the structure of the electrode material occurs, and it is difficult to secure sufficient strength. On the other hand, when the average diameter of the second carbon nanotubes 2 is 30 nm or more, it is difficult to bend the branches due to the excessively high rigidity thereof. Therefore, the second carbon nanotubes 2 cannot be made to be sufficiently entangled with the first carbon nanotubes 1, and the conductivity deteriorates. That is, it is difficult to sufficiently improve the charging-discharging performance of a redox flow battery including this electrode material.

The average diameter of the first carbon nanotubes 1 and the average diameter of the second carbon nanotubes 2 can be obtained, respectively, by measuring the fiber diameters of 100 or more first carbon nanotubes 1 and 100 or more second carbon nanotubes 2 with an electron microscope and obtaining arithmetic average values thereof.

The amount of the second carbon nanotubes 2 added with respect to 100 parts by mass of the first carbon nanotubes 1 is preferably 1 part by mass to 20 parts by mass, is more preferably 4 parts by mass to 17 parts by mass, and is still more preferably 8 parts by mass to 14 parts by mass. When the second carbon nanotubes 2 are added in the above-described range, the conductivity of an electrode formed of the electrode material is improved. The reason for this is presumed to be as follows. Since the second carbon nanotubes 2 are added in the above-described range, the first carbon nanotubes 1 function as the main reason for conductivity, and the second carbon nanotubes 2 electrically connect the first carbon nanotubes 1 to each other so as to efficiently support the conductivity.

It is preferable that the electrode material according to the present invention includes a water-soluble conductive polymer. The water-soluble polymer is adhered to surfaces of the carbon nanotubes (the first carbon nanotubes 1 and the second carbon nanotubes 2) such that the surfaces of the carbon nanotubes, which are originally water-repellent, are treated to be hydrophilic. In general, for the hydrophilic treatment, for example, an OH group or a COOH group may be introduced into the surface of the carbon material, but it is preferable that the conductive polymer is added because the electrical resistance of an electrode obtained by the addition of the conductive polymer can be reduced. The reason why high hydrophilicity can reduce the electrical resistance of the electrode is as follows. An electrolyte of a redox flow battery is an aqueous solution, and this electrolyte penetrates into gaps of the electrode formed of the carbon nanotubes and causes an electrode reaction to efficiently occur.

As the water-soluble conductive polymer, a conductive polymer having a sulfo group is preferable, and poly(isothianaphthenesulfonic acid) is more preferable. When the water-soluble conductive polymer has a sulfo group, a self-doping type conductive polymer and can exhibit stable conductivity. In addition, since the sulfo group is hydrophilic, there is an advantageous effect in that an affinity to the electrolyte is high. In particular, poly(isothianaphthenesulfonic acid) is more preferable for the following reason: since an isothianaphthene structure has a benzene ring and thus has π electrons, the affinity of the structure of the carbon nanotubes constituting the electrode to the π electrons is high.

A method for producing an electrode material according to the present invention includes a step of mixing first carbon nanotubes having an average diameter of 100 nm or more and second carbon nanotubes having an average diameter of 30 nm or less with each other in a conductive polymer aqueous solution using a wet jet mill. By using the wet jet mill, the second carbon nanotubes can be dispersed while suppressing damages of, in particular, the first carbon nanotubes. The pressure during the mixing is preferably 100 MPa or higher and more preferably 150 MPa to 250 MPa. In the above-described range, the second carbon nanotubes can be dispersed more efficiently while limiting damage of the first carbon nanotubes.

By using the conductive polymer aqueous solution, the carbon nanotubes can be easily dispersed during the mixing using the wet jet mill. A surface of an electrode formed of the electrode material according to the present invention is likely to be hydrophilic. The reason for this is not clear in detail but is presumed to be that the conductive polymer remains on the surface of the obtained electrode material.

The conductive polymer aqueous solution may be supplied such that concentration thereof is excessive with respect to the remaining amount.

The concentration of conductive polymer aqueous solution can be verified in a preliminary experiment and, for example, can be determined to be excessive when the concentration of the conductive polymer does not significantly decrease even after supplying the carbon nanotubes into the conductive polymer aqueous solution.

As the conductive polymer in the conductive polymer aqueous solution, a conductive polymer having a sulfo group is preferable, a conductive polymer having a sulfo group and further having isothianaphthenesulfonic acid as a repeating unit is more preferable, and poly(isothianaphthenesulfonic acid) is still more preferable.

Figure 2:
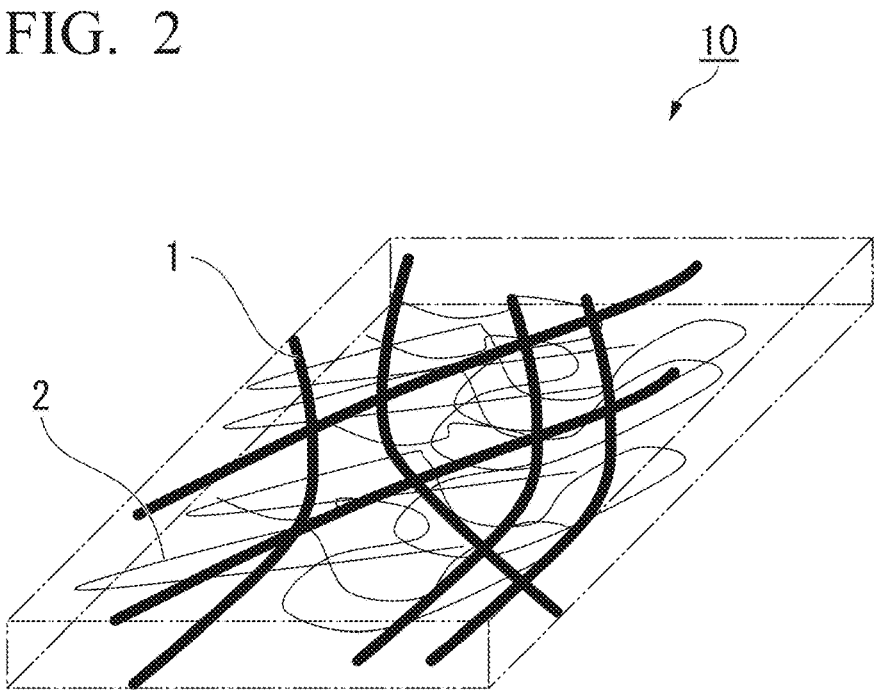
FIG. 2 is a perspective cross-sectional view showing a redox flow battery electrode according to an embodiment of the present invention.

FIG. 2 is a perspective cross-sectional view showing a redox flow battery electrode according to an embodiment of the present invention. As shown in FIG. 2, a redox flow battery electrode 10 includes the above-described electrode material. That is, the redox flow battery electrode 10 includes the first carbon nanotubes 1 and the second carbon nanotubes 2. Although not particularly limited thereto, in general, the redox flow battery electrode has a sheet shape (felt sheet shape). A method of forming the electrode material into a sheet shape is not particularly limited, and examples thereof include film press forming and a paper making method of dispersing the electrode material in an appropriate dispersion medium and casting the dispersion.

During the forming of the electrode material, an appropriate structure may be used in order to promote the forming.

For example, the electrode material according to the present invention is formed together with preferably conductive fibers and more preferably carbon fibers. In addition, during the forming, an additive such as catalytic metal or binder may be used appropriately together with the electrode material.

Figure 3:
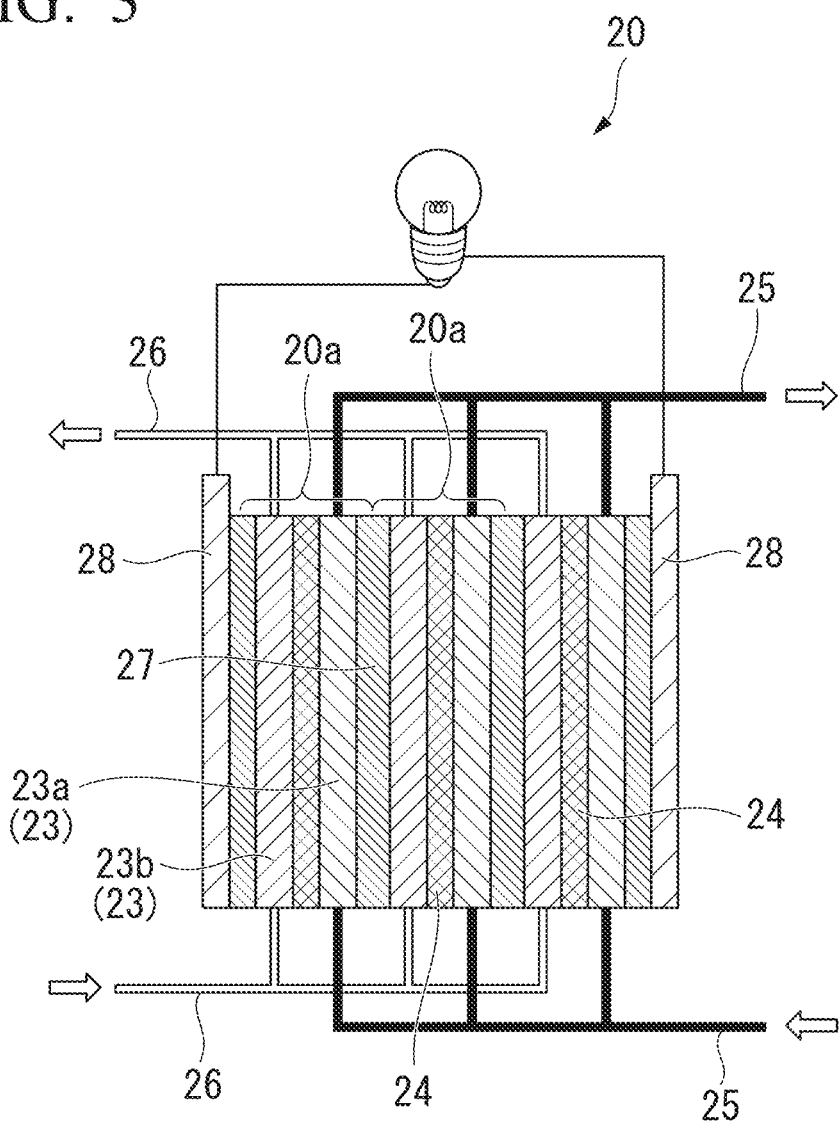
FIG. 3 is a cross-sectional view schematically showing an example of a redox flow battery according to an embodiment of the present invention.

FIG. 3 is cross-sectional view schematically showing an example of a redox flow battery according to an embodiment of the present invention. The electrode manufactured through the above-described steps can be incorporated into a redox flow battery shown in FIG. 3 using an ordinary method. This battery may operate according to a general operating method for a redox flow battery.

A redox flow battery 20 shown in FIG. 3 includes plural cells 20a that are provided between current collector plates 28 and 28. In each of the cells 20a, an electrode 23 and a bipolar plate 27 are arranged on each of opposite sides of the diaphragm 24. The bipolar plate 27 is shared by two cells 20a which are arranged adjacent to each other.

As the electrodes 23, each of the cells 20a includes a positive electrode 23a and a negative electrode 23b. The positive electrode 23a of each of the cells 20a is arranged opposite to the adjacent negative electrode 23b of the cell 20a with the diaphragm 24 interposed therebetween. The above-described redox flow battery electrode can be used as the positive electrode 23a or the negative electrode 23b. A positive electrode electrolytic solution is supplied into the positive electrode 23a through a positive electrode tube 25, and a negative electrode electrolytic solution is supplied into the negative electrode 23b through a negative electrode tube 26.

EXAMPLES

Hereinafter, the present invention will be described in more detail using Examples according to the present invention. These Examples are exemplary examples for convenience of description, and the present invention is not limited thereto.

Example 1

As the first carbon nanotubes, 900 g of VGCF (registered trade name)-H (average diameter: 150 nm, average fiber length: 10 μm) was used. As the second carbon nanotubes, 100 g of VGCF (registered trade name)-X (average diameter: 15 nm, average fiber length: 3 μm) was used. These carbon nanotubes were put into a solution in which 0.5 g of poly(isothianaphthenesulfonic acid) was dissolved in 50 L of pure water, and the components were preliminarily mixed with each other using a mixer (ULTRA-TURRAX UTC 80, manufactured by IKA).

The obtained mixture was treated using a wet jet mill (STARBURST HJP-25005, manufactured by Sugino Machine Ltd.) at a pressure of 200 MPa. 100 g of carbon short fibers (DONACARBO CHOP S-232, manufactured by Osaka Gas Chemicals Co., Ltd.) as a structure were added to the obtained slurry, and the components were mixed with each other again using a wet jet mill (ULTRA-TURRAX UTC 80).

3 L of the slurry to which the carbon short fiber was added was cast into a rectangular filter having a width of 210 mm and a length of 300 mm and was filtered in a vacuum to prepare a cake. The obtained cake was compressed under a total load of 20 ton, and a weight was placed thereon. Next, the cake was put into a dryer at 200° C. to be dried. The thickness of the dried cake was 5 mm, and the total weight thereof was 56 g. The dried cake was cut into a size of 50 mm×50 to prepare an electrode. FIG. 1 is a transmission electron microscope image showing the obtained electrode material. The electrode material had a structure in which the second carbon nanotubes 2 were adhered to surfaces of the first carbon nanotubes 1 such that the second carbon nanotubes 2 bridged between the plural first carbon nanotubes 1. 100 second carbon nanotubes in total of the electrode material were observed with a transmission electron microscope. As a result, 72 second carbon nanotubes 2 bridged between the plural first carbon nanotubes 1.

The two obtained electrodes were prepared as a cathode and an anode, respectively, and were incorporated into a redox flow battery, and the output of the redox flow battery was tested. A divalent vanadium ion ($V^{+2}$) aqueous solution was introduced into the anode side, and a pentavalent vanadium ion ($V^{+5}$) aqueous solution was introduced into the cathode side. The respective aqueous solutions were circulated in a tube pump. These vanadium ion aqueous solutions contained 4.5 M of sulfuric acid. As a diaphragm interposed between the electrodes, NAFION (registered trade name) was used.

In the redox flow battery, the vanadium ion concentration in the solution was 1.5 M, and the total amount of the solution used was 50 ml. Accordingly, the theoretical capacity was 7200 coulomb.

The redox flow battery was discharged at a constant current of 1 A. During this discharging, a potential difference between the cathode and the anode was used as an electromotive force, and the discharging ended when the electromotive force reached 1.0 V. The electromotive force started from 1.7 V and reached 1.0 V, and the average thereof was 1.2 V. At this time, the electric quantity was 7000 coulomb. The discharging time was 117 minutes.

After completion of the discharging, the redox flow battery was charged at a constant current of 1 A. When a potential difference between the cathode and the anode reached 1.6 V, the charging was switched to constant-voltage charging. At this time, the charging capacity was 7200 coulomb.

Example 2

An electrode having a size of 50 mm×50 mm was prepared under the same conditions as in Example 1, except that: 15 g of poly(isothianaphthenesulfonic acid) was dissolved; and carbon short fibers were not added. When observed with a transmission electron microscope, it was verified that the obtained electrode material had a structure in which, as in the case of Example 1, the second carbon nanotubes bridged between the plural first carbon nanotubes.

The obtained electrode was incorporated into a redox flow battery as in the case of Example 1, and the output of the redox flow battery was tested. In the discharging at a constant current of 1 A, the electromotive force started from 1.7 V and the average thereof was 1.2 V. At this time, the electric quantity was 7100 coulomb. The discharging time was 122 minutes.

After completion of the discharging, the redox flow battery was charged at a constant current of 1 A. At this time, the charging capacity was 7200 coulomb.

Example 3

An electrode having a size of 50 mm×50 mm was prepared under the same conditions as in Example 1, except that: 900 g of carbon nanotubes having an average diameter of 100 nm was used as the first carbon nanotubes. After the drying, a plurality of small cracks were observed by visual inspection on an outer circumferential portion of the compressed cake. However, an electrode having no cracks was able to be extracted from a portion of the cake other than the outer circumferential portion. When observed with a transmission electron microscope, it was verified that the obtained electrode material had a structure in which, as in the case of Example 1, the second carbon nanotubes bridged between the plural first carbon nanotubes.

The obtained electrode was incorporated into a redox flow battery as in the case of Example 1, and the output of the redox flow battery was tested. In the discharging at a constant current of 1 A, the electromotive force started from 1.7 V and the average thereof was 1.1 V. At this time, the electric quantity was 6200 coulomb. The discharging time was 102 minutes.

After completion of the discharging, the redox flow battery was charged at a constant current of 1 A. At this time, the charging capacity was 6400 coulomb.

Example 4

An electrode having a size of 50 mm×50 mm was prepared under the same conditions as in Example 1, except that: 100 g of carbon nanotubes having an average diameter of 30 nm were used as the second carbon nanotubes. After the drying, a plurality of small cracks were observed by visual inspection on an outer circumferential portion of the compressed cake. However, an electrode having no cracks was able to be extracted from the center of the compressed cake. When observed with a transmission electron microscope, it was verified that the obtained electrode material had a structure in which, as in the case of Example 1, the second carbon nanotubes bridged between the plural first carbon nanotubes.

The obtained electrode was incorporated into a redox flow battery as in the case of Example 1, and the output of the redox flow battery was tested. In the discharging at a constant current of 1 A, the electromotive force started from 1.7 V and the average thereof was 1.1 V. At this time, the electric quantity was 6100 coulomb. The discharging time was 95 minutes.

After completion of the discharging, the redox flow battery was charged at a constant current of 1 A. At this time, the charging capacity was 6300 coulomb.

Comparative Example 1

An electrode material was prepared under the same conditions as in Example 1, except that: 1000 g of the second carbon nanotubes were used; and the first carbon nanotubes were not used. The second carbon nanotubes were added to a slurry in a wet jet mill, and the slurry were cast into a filter and were dried using the same method. However, the dried and compressed slurry was scattered, and a specimen having a size of 50 mm×50 mm was not able to be obtained. Therefore, the process was not able to proceed the next step. The reason for this is presumed to be that not only the wet jet mill but also the first carbon nanotubes contribute to the dispersing of the second carbon nanotubes.

Comparative Example 2

A redox flow battery was prepared under the same conditions as in Example 1 except that: 1000 g of the first carbon nanotubes were used; and the second carbon nanotubes were not used. Using the redox flow battery, the evaluation was performed.

A slurry was cast into the same filter as in Example 1 and was dried and extracted using the same method as in Example 1. Several large cracks were formed on the slurry. A large cracked piece was selected, and a specimen having a size of 50 mm×50 mm was cut therefrom and was incorporated into a redox flow battery using the same method. This redox flow battery was charged and discharged using the same method. In the discharging at a constant current of 1 A, the electromotive force started from 1.5 V and reached 1.0 V. At this time, the electric quantity was 5400 coulomb.

Comparative Example 3

A slurry was cast into the filter and was dried and extracted under the same conditions as in Example 1, except that: 900 g of carbon nanotubes having an average diameter of 80 nm were used as the first carbon nanotubes. A plurality of large cracks were formed on the entire region of the compressed cake, and a specimen having a size of 50 mm×50 mm was not able to be obtained. Therefore, the process was not able to proceed to the next step. When scattered small pieces were observed with a transmission electron microscope, the structure in which the second carbon nanotubes bridged between the plural first carbon nanotubes was not observed.

Comparative Example 4

A slurry was cast into the filter and was dried and extracted under the same conditions as in Example 1, except that: 100 g of carbon nanotubes having an average diameter of 80 nm were used as the second carbon nanotubes. The compressed cake was scattered during drying and compressing, and a specimen having a size of 50 mm×50 mm was not able to be obtained. Therefore, the process was not able to proceed to the next step.

When scattered small pieces were observed with a transmission electron microscope, the structure in which the second carbon nanotubes bridged between the plural first carbon nanotubes was not observed as in the case of Comparative Example 3.

Comparative Example 5

A slurry was cast into the filter and was dried and extracted under the same conditions as in Example 1, except that the treatment using the wet jet mill (STARBURST HJP-25005, manufactured by Sugino Machine Ltd.), which was performed after the preliminary mixing using the mixer in Example 1, and the mixing using the wet jet mill (ULTRA-TURRAX UTC 80,), which was performed after the addition of the carbon short fibers in Example 1, were not performed. The compressed cake was scattered during drying and compressing, and a specimen having a size of 50 mm×50 mm was not able to be obtained. Therefore, the process was not able to proceed to the next step.

When scattered small pieces were observed with a transmission electron microscope, the second carbon nanotubes aggregated, and this aggregate and the first carbon nanotubes were present together. As in the case of Comparative Examples 3 and 4, the structure in which the second carbon nanotubes bridged between the plural first carbon nanotubes was not observed.

REFERENCE SIGNS LIST

1: FIRST CARBON NANOTUBE
2: SECOND CARBON NANOTUBE
10: REDOX FLOW BATTERY ELECTRODE
20: REDOX FLOW BATTERY
20a: CELL
23: ELECTRODE
23a: POSITIVE ELECTRODE
23b: NEGATIVE ELECTRODE
24: DIAPHRAGM
25: POSITIVE ELECTRODE TUBE
26: NEGATIVE ELECTRODE TUBE
27: BIPOLAR PLATE
28: CURRENT COLLECTOR PLATE

What is claimed is:

1. An electrode material comprising:
   first carbon nanotubes having an average diameter of 100 nm or more; and
   second carbon nanotubes having an average diameter of 30 nm or less,
   wherein the second carbon nanotubes are adhered to surfaces of the first carbon nanotubes such that the individual second carbon nanotubes bridge between the plural first carbon nanotubes, and
   when 100 arbitrary second carbon nanotubes are observed with a transmission electron microscope, 10 or more second carbon nanotubes bridge between the plural first carbon nanotubes.

2. The electrode material according to claim 1,
   wherein the second carbon nanotubes are entangled with the first carbon nanotubes.

3. The electrode material according to claim 1,
   wherein the average diameter of the first carbon nanotubes is 100 nm to 1000 nm.

4. The electrode material according to claim 1,
   wherein the average diameter of the second carbon nanotubes is 1 nm to 30 nm.

5. The electrode material according to claim 1,
   wherein an amount of the second carbon nanotubes added with respect to 100 parts by mass of the first carbon nanotubes is 1 part by mass to 20 parts by mass.

6. The electrode material according to claim 1,
   wherein an amount of the second carbon nanotubes added with respect to 100 parts by mass of the first carbon nanotubes is 4 part by mass to 17 parts by mass.

7. The electrode material according to claim 1,
   wherein fiber lengths of the first carbon nanotubes and the second carbon nanotubes are 1 µm to 100 µm.

8. The electrode material according to claim 1,
   wherein the electrode material is produced by the method comprising
   a step of mixing the first carbon nanotubes having the average diameter of 100 nm or more and the second carbon nanotubes having the average diameter of 30 nm or less with each other in a conductive polymer aqueous solution using a wet jet mill.

9. The electrode material according to claim 1, further comprising
   a water-soluble conductive polymer.

10. The electrode material according to claim 9,
    wherein the water-soluble conductive polymer is a conductive polymer having a sulfo group.

11. A redox flow battery electrode comprising
    the electrode material according to claim 1.

12. A redox flow battery comprising
    the redox flow battery electrode according to claim 11.

13. A method for producing the electrode material according to claim 1,
    the method comprising
    a step of mixing the first carbon nanotubes having the average diameter of 100 nm or more and the second carbon nanotubes having the average diameter of 30 nm or less with each other in a conductive polymer aqueous solution using a wet jet mill.

14. The method for producing an electrode material according to claim 13,
    wherein the mixing using the wet jet mill is performed at a pressure of 150 MPa or higher.

* * * * *